United States Patent Office 3,833,574

Patented Sept. 3, 1974

3,833,574

BENZIMIDAZOLINONE COMPOUNDS

Rudiger D. Haugwitz, Titusville, and Venkatachala L. Narayanan, Hightstown, N.J., assignors to E. R. Squibb & Sons, Inc., Princeton, N.J.

No Drawing. Original application July 31, 1972, Ser. No. 276,507. Divided and this application Nov. 6, 1973, Ser. No. 413,287

Claims priority, application Canada, July 18, 1973, 176,701

Int. Cl. C07d *93/06*

U.S. Cl. 260—243 R  3 Claims

ABSTRACT OF THE DISCLOSURE

Benzimidazolinone compounds which exhibit antiinflammatory activity have the following formula

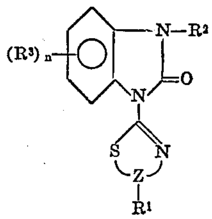

I wherein

Z is ethylene or propylene;

$R^1$ is hydrogen, methyl, ethyl, phenyl, nitrophenyl, benzyl, phenethyl, tolyl or xylyl;

$R^2$ is hydrogen; alkyl of from 1 to 5 carbons; benzyl; nitrobenzyl; phenethyl; nitrophenethyl;

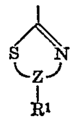

wherein Z and $R^1$ are as defined above; alkoxycarbonyl wherein the alkoxy radical is from 1 to 10 carbon atoms; phenoxycarbonyl; or substituted phenoxycarbonyl wherein the substituent is nitro, halo or alkyl of from 1 to 5 carbons; acyl of from 2 to 6 carbon atoms; benzoyl or substituted benzoyl wherein the substituent is halogen or alkyl of from 1 to 3 carbons; symmetrically dialkyl-substituted carbamoyl wherein the alkyl radical has from 1 to 3 carbons; and dialkylamino-alkylene wherein the dialkyl radicals have from 1 to 3 carbons and the alkylene radical has 2 or 3 carbons;

$R^3$ is hydrogen, halogen, nitro, cyano, trifluoromethyl, alkyl of from 1 to 3 carbon atoms, alkoxy of from 1 to 3 carbon atoms, amino, dialkylamino wherein the alkyl radical has from 1 to 3 carbon atoms, alkanoyl of from 2 to 6 carbons, alkylamido of from 2 to 6 carbons, or benzoyl; and

*n* is 0, 1 or 2.

RELATED APPLICATIONS

This application is a division of Ser. No. 276,507 filed July 31, 1972.

OBJECTS OF THE INVENTION

It is an object of the present invention to provide new compounds having antiinflammatory activity. Another object is to provide a method for the preparation of these compounds. Still another object is to provide pharmaceutical compositions for the administration of these compounds. These and other objects of the present invention will be apparent from the following description.

DETAILED DESCRIPTION

Compounds of structure I can be prepared by first converting the benzimidazolone (II) wherein $R^2$ is other than

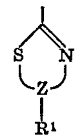

into the salt (III). Metal hydrides such as sodium hydride, metal amides such as sodium amide or potassium amide, or alkali metal alkoxides such as sodium methoxide, potassium ethoxide or sodium butoxide, may be used to form the salt:

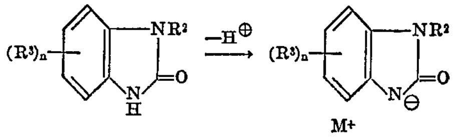

II  III

Interaction of the salt III with the haloalkyl isothiocyanate IV gives the compound of formula I wherein $R^2$ is H. The foregoing reactions can be brought about in a variety of non-protic solvents such as aromatic hydrocarbons, e.g., benzene, toluene or xylene, or ethers, e.g., ethyl ether or ethylene glycol dimethyl ether, at temperatures ranging from about 0° to about 150° for periods of from about one hour to about twenty-four hours. A slight excess of the employed base is advantageous; thus the molar ratio of benzimidazolone (II) to base may range from about 1:1 to about 1:2.

Compounds of formula I wherein $R^2$ is

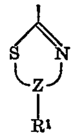

may be prepared by reacting a compound of formula II wherein $R^2$ is H with at least two equivalents each of haloisothiocyanate and NaH. Compounds of formula I wherein $R^2$ is

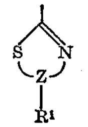

may also be prepared starting from a compound of formula I wherein $R^2$ is H by reacting this compound of formula I with haloalkyl isothiocyanate and NaH. The reaction time can range from one to about twenty-four hours at temperatures of from about 25° to about 150°. The synthesis of benzimidazolones of formula II is well documented in the following publications.

(a) "The Chemistry of the Benzimidazoles," J. B. Wright, *Chem. Rev.*, 1951, *48*, 397.

(d) "Benzimidazoles," "Chemistry of Carbon Com-Pozharskii, A. D. Garnovskii, and A. M. Simonov, *Russ. Chem. Rev.*, 1966, *35*, 122.

(c) "Imidazoles and Condensed Imidazoles," "Heterocyclic Compounds," ed. R. C. Elderfield, Vol. 5, p. 194.

(d) "Benzimidazoles," "Chemistry of Carbon Compounds," ed. E. H. Rodd, Vol. IV A, p. 321 )1957).

The haloalkyl isothiocyanates of formula IV can be readily prepared from their haloalkylamines V and thiophosgene:

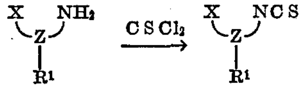

V IV

Additional routes toward isothiocyanates are described in Houben-Weyl's *Methoden Der Organischen Chemie,* Vol. 9, G. Thieme Verlag, Stuttgart (1955).

Examples of aliphatic haloalkyl isothiocyanates which can be employed herein include the following:

$SCN-CH_2-CH_2-Br$ $SCN-CH_2-CH_2-CH_2-Cl$

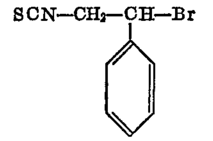

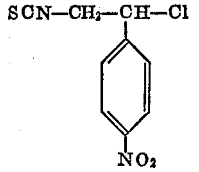

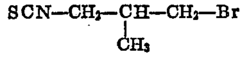

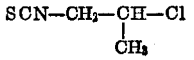

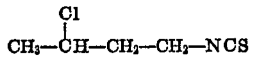

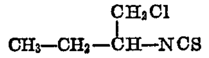

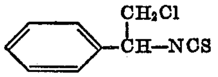

Typical compounds included in the present invention are the following:

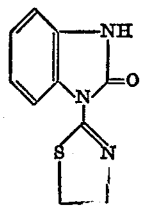

1.

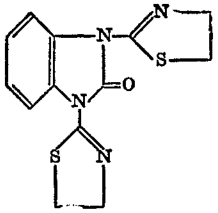

2.

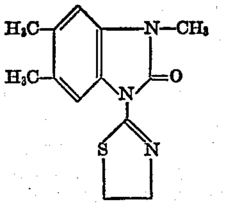

3.

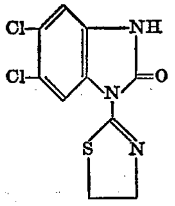

4.

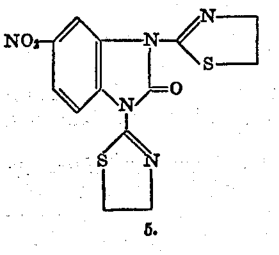

5.

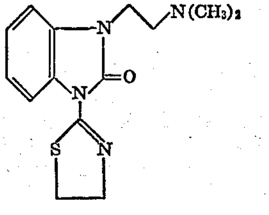

6.

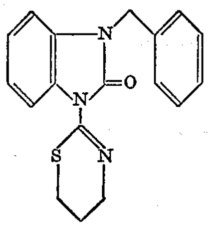

7.

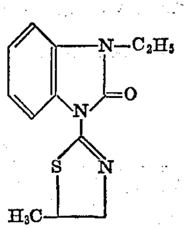

8.

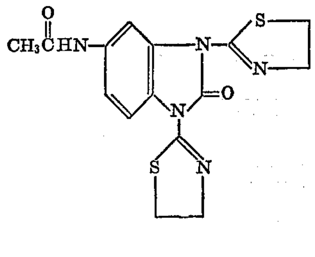

9.

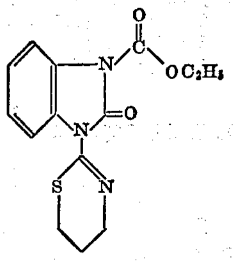

10.

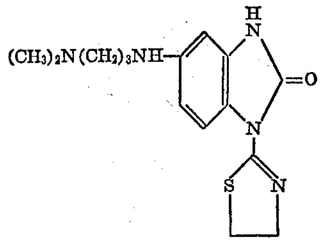

11.

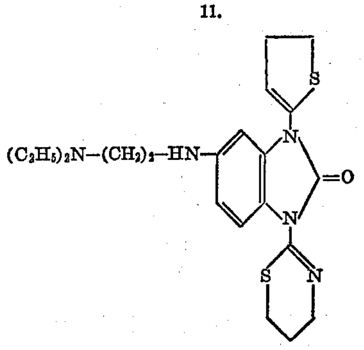

12.

13.

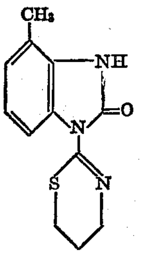

The compounds of formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate, and the like.

The compounds of this invention are useful as anti-inflammatory agents and are effective in the prevention and inhibition of granuloma tissue formation in warm blooded animals, for example in a manner similar to phenylbutazone or indomethacin. They may be used to decrease joint swelling tenderness, pain and stiffness in mammalian species, e.g., in conditions such as rheumatoid arthritis. The compounds of this invention or a physiologically acceptable acid-addition salt thereof may be compounded according to accepted pharmaceutical practice for administration orally or by injection. Suitable oral dosage forms are tablets, capsules, elixirs, suppositories, or powders, while solutions or suspensions are suitable for injection. The quantity administered may be from about 25 mg. to about 2 gm. per day, and preferably from about 50 mg. to about 200 mg. per day.

The present invention consists of compounds having the following formula

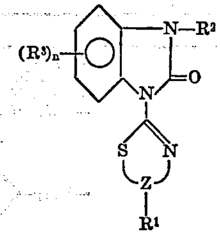

wherein

Z is ethylene or propylene.

$R^1$ is hydrogen, methyl, ethyl, phenyl, nitrophenyl, benzyl, phenethyl, tolyl, or xylyl.

$R^2$ is hydrogen; alkyl of from 1 to 5 carbons, e.g., methyl, ethyl, n-propyl, i-propyl, n-butyl, i-butyl, t-butyl, n-pentyl, 2-methyl-n-butyl, or neopentyl; benzyl; nitrobenzyl; phenethyl; nitrophenethyl;

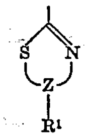

wherein Z and $R^1$ are as defined above; alkoxycarbonyl wherein the alkoxy radical is from 1 to 10 carbon atoms, e.g., methoxy, alkoxy, propoxy, isopropoxy, butoxy, isobutoxy, t-butoxy, pentyloxy, hexyloxy, heptyloxy, octyloxy, nonyloxy, or decyloxy; phenoxycarbonyl; or substituted-phenoxycarbonyl wherein the substituent is nitro, halogen (F, Cl, Br or I), or alkyl of from 1 to 5 carbons, examples of which have been mentioned above; acyl of from 2 to 6 carbon atoms, e.g., acetyl, propionyl, n-butyroyl, n-valeroyl, trimethylacetyl, or hexanoyl; benzoyl, or substituted benzoyl wherein the substituent is halogen (F, Cl, Br or I); or alkyl of from 1 to 3 carbons, e.g., methyl, ethyl, propyl, or i-propyl; symmetrically dialkyl-substituted carbamoyl wherein the alkyl radical has from 1 to 3 carbons, e.g., methyl, ethyl, n-propyl, or i-propyl; and dialkylaminoalkylene wherein the dialkyl radicals have from 1 to 3 carbons, e.g., methyl, ethyl, propyl, or i-propyl, and the alkylene radical has 2 or 3 carbons, e.g., ethylene, propylene or i-propylene.

$R^3$ is hydrogen; halogen (F, Cl, Br or I); nitro; cyano, trifluoromethyl; alkyl of from 1 to 3 carbons, e.g., methyl, ethyl, n-propyl, or i-propyl; alkoxy of from 1 to 3 carbons, e.g., methoxy, ethyloxy, n-propoxy or i-propoxy; amino; dialkylamino wherein the alkyl radical has from 1 to 3 carbons, e.g., methyl, ethyl, n-propyl or i-propyl; alkanoyl of from 2 to 6 carbons, e.g., acetyl, propionyl, n-butyroyl, n-valeroyl, trimethylacetyl, or hexanoyl; alkylamido of from 2 to 6 carbons, e.g., wherein the alkyl radical may be methyl, ethyl, n-propyl, i-propyl, n-butyl, i-butyl, t-butyl, n-pentyl, 2-methyl-n-butyl, or neopentyl; or benzoyl.

*n* is 0, 1 or 2.

The following examples illustrate the present invention without, however, limiting the same thereto. All temperatures are expressed in degrees Celsius.

EXAMPLE 1

1-(2-Thiazolin-2-yl)-2-benzimidazolinone

To a slurry of 5.0 g. of benzimidazolone in 250 ml. dry ethylene glycol dimethyl ether there is added 1.2 g. of sodium hydride and the mixture is stirred for two hours. There is then added 4.2 g. of 2-chloroethyl isothiocyanate in 5 ml. of dry ethylene glycol dimethyl ether and the mixture is refluxed for two hours. The solvent is removed *in vacuo* and water is added to the residue. The resulting solid is filtered off, dried and slurried in 80 ml. of chloroform. After sitting overnight the yellow solution is filtered off and the white residue is crystallized from $CHCl_3$ to yield 1.9 g. m.p. 211–212°.

EXAMPLE 2

1,3-bis(2-Thiazolin-2-yl)-2-benzimidazolinone

To a slurry of 4.0 g. of benzimidazolone in 250 ml. of dry ethylene glycol dimethyl ether there is added 2.0 g. of sodium hydride and the mixture is stirred at room temperature for two hours. Then there is added 7.2 g. of 2-chloroethyl isothiocyanate in 10 ml. of dry ethylene glycol dimethyl ether and the mixture is refluxed for two hours. The solvent is removed *in vacuo* and water is added to the residue. The resulting solid is filtered off and crystallized from ethylene glycol dimethyl ether to yield 2.7 g., m.p. 228–230°.

EXAMPLE 3

5- and 6-Chloro-1-(2-thiazolin-2-yl)-2-benzimidazolinone

To a solution of 5.0 g. of 5-chlorobenzimidazolone in 250 ml. dry ethylene glycol dimethyl ether there is added 1.3 g. of sodium hydride. The solution is stirred at room temperature for two hours and then 4.3 g. of 3-chloroethyl isothiocyanate in 5 ml. of dry ethylene glycol dimethyl ether is added. The mixture is refluxed for two hours and the solvent is removed *in vacuo*. Water is added to the residue. The resulting solid is filtered off, dried and crystallized from $CHCl_3$ to yield 3.0 g. of the isomeric mixture, m.p. 220–228°.

EXAMPLE 4

5- and 6-Chloro-1-[2-(dimethylamino)-ethyl]-3-(2-thiazolin-2-yl)-2-benzimidazolinone To a solution of 5.2 g. of 5- and 6-chloro-1-(2-thiazolin-2-yl)-2-benzamidazolinone in 250 ml. of dry ethylene glycol dimethyl ether there is added 0.6 g. of sodium hydride and the mixture is stirred at room temperature for one hour. There is then added a solution of 2.2 g. of N,N-dimethylamino-2-chloroethane in 50 ml. of toluene and the mixture is refluxed for five hours. An additional 0.3 g. of sodium hydride is added and the mixture is stirred for 0.5 hour. N,N - Dimethylamino-2-chloroethane (1.1 g.) in 25 ml. of toluene is added and the mixture is refluxed overnight. The solvent is removed *in vacuo* and water is added to the residue. The resulting oil is extracted with $CHCl_3$, dried over $MgSO_4$ and the $CHCl_3$ removed *in vacuo*. The oily residue is chromatographed on an Alumina Act IV column; elution with 1:1 petroleum ether-ether yields 1.0 g., m.p. 95–112° C.

EXAMPLE 5

1-(2-Thiazolin-2-yl)-3-benzyl-benzimidazolinone

To 0.25 g. of the product of Example 1 (0.001 mole) in 25 ml. of dry ethylene glycol dimethyl ether there is added 0.03 g. of NaH and the mixture is stirred at room temperature for one hour. There is then added a solution of 0.17 g. (0.001 mole) of benzyl bromide in 5 ml. of toluene and the mixture is refluxed for 5 hours. An additional 0.015 g. of NaH is added and the mixture stirred for 0.5 hour. Benzyl bromide 0.09 g. (0.0005 mole) in 2.5 ml. of toluene is added and the mixture refluxed overnight. The solvent is removed *in vacuo* and water is added to the residue. The resulting oil is extracted with $CHCl_3$, dried over $MgSO_4$ and the $CHCl_3$ removed *in vacuo*. The oily residue is chromtographed on an alumina Act IV column and eluted with 1:1 petroleum ether-ether to yield the title compound.

EXAMPLES 6–44

Repeating the procedure of Example 5 but substituting respectively for benzyl bromide the compounds listed below in Column I, there is obtained respectively the compound of the following formula wherein $R^2$ is the radical listed in Column II:

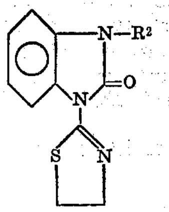

(I)

| Example | I | II |
|---|---|---|
| 6 | $C_2H_5Br$ | $-C_2H_5$ |
| 7 | $n\text{-}C_5H_{11}Cl$ | $-n\text{-}C_5H_{11}$ |
| 8 | $(CH_3)_2CHCH_2Br$ | $-CH_2CH(CH_3)_2$ |
| 9 | $CH_2{=}CHCH_2Br$ | $-CH_2CH{=}CH_2$ |
| 10 | 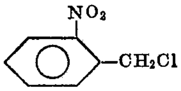 | 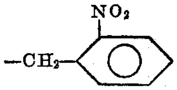 |
| 11 | 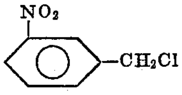 | 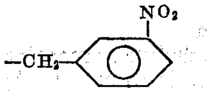 |
| 12 |  | 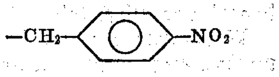 |
| 13 | 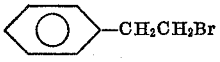 | 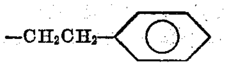 |
| 14 |  | 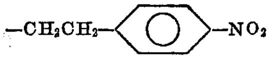 |
| 15 | $SCN(CH_2)_3Cl$ | 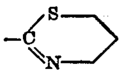 |
| 16 | $C_2H_5OC(=O)-Cl$ | $-C(=O)OC_2H_5$ |
| 17 | 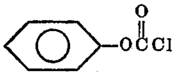 | 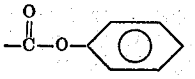 |
| 18 | 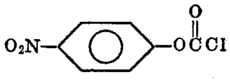 | 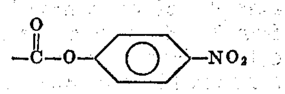 |
| 19 | 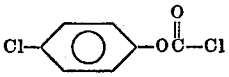 | 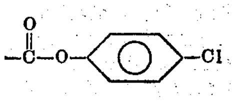 |
| 20 | 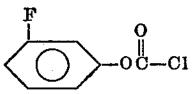 | 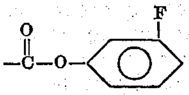 |
| 21 | 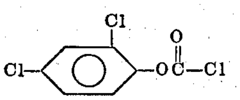 | 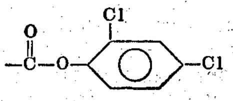 |
| 22 | 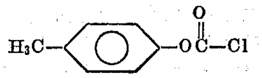 | 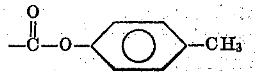 |
| 23 | 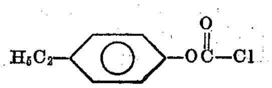 | 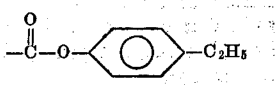 |
| 24 | 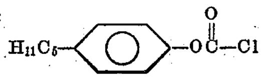 | 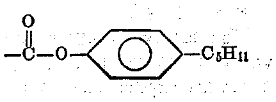 |

TABLE—Continued

| Example | I | II |
|---|---|---|
| 25 | 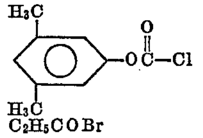 | 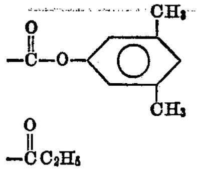 |
| 26 | $C_2H_5COBr$ | $-\overset{O}{\overset{\|}{C}}C_2H_5$ |
| 27 | $CH_3COBr$ | $-\overset{O}{\overset{\|}{C}}CH_3$ |
| 28 | $CH_3(CH_2)_4COCl$ | $-\overset{O}{\overset{\|}{C}}(CH_2)_4CH_3$ |
| 29 | 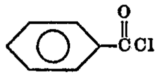 | 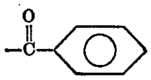 |
| 30 | 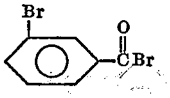 | 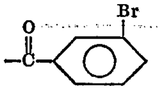 |
| 31 | 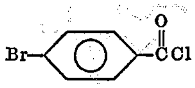 | 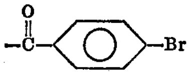 |
| 32 | 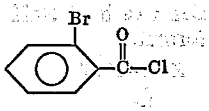 | 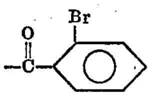 |
| 33 | 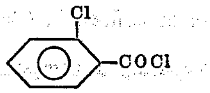 | 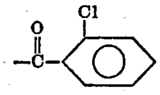 |
| 34 | 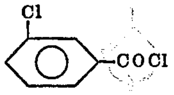 | 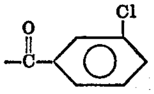 |
| 35 | 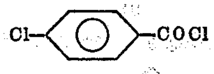 | 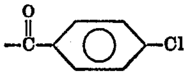 |
| 36 | 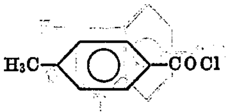 | 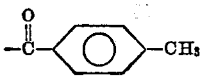 |
| 37 | 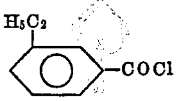 | 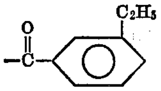 |
| 38 | 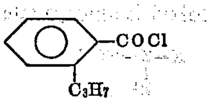 | 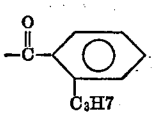 |
| 39 | $(C_2H_5)_2N\overset{O}{\overset{\|}{C}}Cl$ | $-\overset{O}{\overset{\|}{C}}-N(C_2H_5)_2$ |
| 40 | $(CH_3)_2N\overset{O}{\overset{\|}{C}}Cl$ | $-\overset{O}{\overset{\|}{C}}-N(CH_3)_2$ |
| 41 | $(C_3H_7)_2N\overset{O}{\overset{\|}{C}}Cl$ | $-\overset{O}{\overset{\|}{C}}-N(C_3H_7)_2$ |
| 42 | $(CH_3)_2NCH_2CH_2Cl$ | $-CH_2CH_2N(CH_3)_2$ |
| 43 | $(C_2H_5)_2NCH_2CH_2CH_2Cl$ | $-CH_2CH_2CH_2N(C_2H_5)$ |
| 44 | $(C_3H_7)_2NCH_2CH_2Cl$ | $-CH_2CH_2N(C_3H_7)_2$ |

EXAMPLES 45–56

Repeating the procedure of Example 1 but substituting for benzimidazolone the substituted benzimidazolone of formula I wherein the $R^3$ substituent(s) in the 4-, 5-, 6- or 7-positions are listed in Column 1, and wherein the $R^2$ substituent in the 3-position is listed in Column 2, there is obtained respectively the correspondingly $R^2$ and/or $R^3$-substituted 1 - (2-thiazolin-2-yl) - 2 - benzimidazolinone:

| Example | R³ 4 | 5 | 6 | 7 | R² |
|---|---|---|---|---|---|
| 45 | | —$NO_2$ | —$NO_2$ | | |
| 46 | —$OCH_3$ | | | —$OCH_3$ | |
| 47 | | —$OC_2H_5$ | | | |
| 48 | | Cl | | | |
| 49 | | 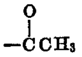 | | | |
| 50 | | —$CF_3$ | | | |
| 51 | | —Cl | —$NO_2$ | | |
| 52 | | —$CH_3$ | | | —$CH_3$ |
| 53 | | | | | —$CH_2$—CH=CH |
| 54 | | | | | 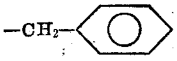 |
| 55 | | —CN | | | |
| 56 | | 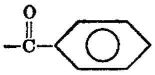 | | | |

What is claimed is:

1. A method of preparing a compound of the formula

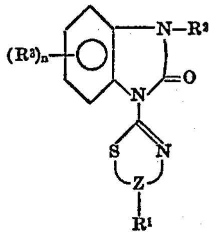

wherein

Z is ethylene or propylene;

$R^1$ is hydrogen, methyl, ethyl, phenyl, nitrophenyl, benzyl, phenethyl, tolyl or xylyl;

$R^2$ is hydrogen;

$R^3$ is hydrogen, halogen, nitro, cyano, trifluoromethyl, alkyl of from 1 to 3 carbon atoms, alkoxy of from 1 to 3 carbon atoms, amino, dialkylamino wherein the alkyl radical has from 1 to 3 carbon atoms, alkanoyl of from 2 to 6 carbons, alkylamido of from 2 to 6 carbons, or benzoyl; and

*n* is 0, 1 or 2 which comprises interacting a salt of the formula

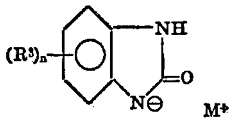

with a haloalkyl isothiocyanate of the formula

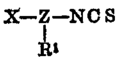

wherein $R^3$, *n*, Z and $R^1$ are as defined in Claim 1 and X is Cl or Br.

2. A method of preparing a compound of Claim 1 wherein $R^2$ is

which comprises reacting a compound of the formula

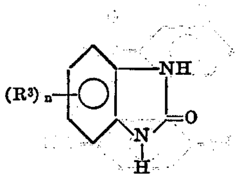

with at least 2 equivalents each of NaH and a haloalkyl isothiocyanate of the formula

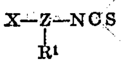

wherein Z and $R^1$ are as defined in Claim 1 and X is Cl or Br.

3. A method of preparing a compound of Claim 1 wherein $R^2$ is

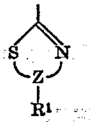

which comprises reacting a compound of the formula

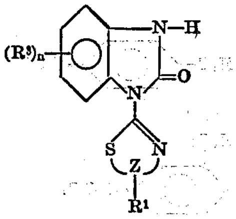

with NaH and a haloalkyl isothiocyanate of the formula

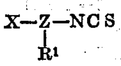

wherein Z and $R^1$ are as defined in Claim 1 and X is Cl or Br.

References Cited

UNITED STATES PATENTS 3,755,316 8/1973 Narayanan et al. ---- 260—243
3,759,903 9/1973 Haugwitz et al. ------ 260—243

JOHN M. FORD, Primary Examiner

U.S. Cl. X.R.

424—246, 270; 260—306.7

PO-1050
(5/69)

UNITED STATES PATENT OFFICE
CERTIFICATE OF CORRECTION

Patent No. 3,833,574 Dated September 3, 1974

Inventor(s) Rudiger D. Haugwitz et al.

It is certified that error appears in the above-identified patent and that said Letters Patent are hereby corrected as shown below:

Column 2, delete line 65 and insert--(b) "Advances in the Chemistry of Imidazoles", A.F.--.

Column 6, line 66, after "benzyl-" insert --2- --.

Signed and sealed this 19th day of November 1974.

(SEAL)
Attest:

McCOY M. GIBSON JR.
Attesting Officer

C. MARSHALL DANN
Commissioner of Patents